(12) United States Patent
Vergara-Escobar (10) Patent No.: US 7,526,745 B2
(45) Date of Patent: Apr. 28, 2009

(54) METHOD FOR SPECIFICATION AND INTEGRATION OF REUSABLE IP CONSTRAINTS

(75) Inventor: Mario Vergara-Escobar, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 382 days.

(21) Appl. No.: 11/294,653

(22) Filed: Dec. 5, 2005

(65) Prior Publication Data

US 2006/0123370 A1 Jun. 8, 2006

Related U.S. Application Data

(60) Provisional application No. 60/662,709, filed on Mar. 16, 2005, provisional application No. 60/634,350, filed on Dec. 8, 2004.

(51) Int. Cl.
*G06F 17/50* (2006.01)
*G06F 19/00* (2006.01)

(52) U.S. Cl. .......... 716/18; 716/2; 716/6; 716/17; 716/7; 703/16; 703/19; 703/28

(58) Field of Classification Search .......... 716/2, 716/6, 7, 17, 18; 703/16, 19, 26, 28
See application file for complete search history.

(56) References Cited

U.S. PATENT DOCUMENTS

| 5,452,225 | A | | 9/1995 | Hammer | |
|---|---|---|---|---|---|
| 5,461,576 | A | | 10/1995 | Tsay et al. | |
| 5,475,607 | A | * | 12/1995 | Apte et al. | 716/10 |
| 5,572,436 | A | | 11/1996 | Dangelo et al. | |
| 5,581,473 | A | * | 12/1996 | Rusu et al. | 716/6 |
| 5,598,344 | A | | 1/1997 | Dangelo et al. | |
| 5,644,499 | A | * | 7/1997 | Ishii | 716/6 |
| 5,663,888 | A | * | 9/1997 | Chakradhar | 716/6 |
| 5,751,596 | A | | 5/1998 | Ginetti et al. | |
| 5,812,416 | A | | 9/1998 | Gupte et al. | |
| 5,812,417 | A | | 9/1998 | Young | |

(Continued)

FOREIGN PATENT DOCUMENTS

EP 0996073 4/2000

(Continued)

OTHER PUBLICATIONS

Abate et al., "Querying and Analysis of Software Specifications", Proceedings of Fourth International Conference on Software Engineering and Knowledge Engineering, Jun. 15-20, 1992, pp. 470-478.*

(Continued)

*Primary Examiner*—Phallaka Kik
(74) *Attorney, Agent, or Firm*—Michael Cameron (57) ABSTRACT

A hardware-block constraint specification method includes defining a plurality of hardware-block constraint categories according to at least one of type of constraint and constraint operating mode and defining a plurality of hardware-block constraint commands. Each of the plurality of hardware-block constraint commands is categorized into one of the plurality of hardware-block constraint categories. The method also includes encapsulating the plurality of hardware-block constraint commands within a plurality of modules usable, via an application programming interface, in a stand-alone mode or an integrated mode.

34 Claims, 3 Drawing Sheets

U.S. PATENT DOCUMENTS

| | | | |
|---|---|---|---|
| 5,819,072 | A | 10/1998 | Bushard et al. |
| 5,825,658 | A | 10/1998 | Ginetti et al. |
| 5,831,869 | A | 11/1998 | Ellis et al. |
| 5,956,256 | A | 9/1999 | Rezek et al. |
| 6,023,567 | A | 2/2000 | Osler et al. |
| 6,097,884 | A | 8/2000 | Sugasawara |
| 6,167,561 | A | 12/2000 | Chen et al. |
| 6,173,435 | B1 | 1/2001 | Dupenloup |
| 6,185,518 | B1 | 2/2001 | Chen |
| 6,189,131 | B1 | 2/2001 | Graef et al. |
| 6,205,572 | B1 | 3/2001 | Dupenloup |
| 6,216,252 | B1 | 4/2001 | Dangelo et al. |
| 6,237,127 | B1 | 5/2001 | Craven et al. |
| 6,263,483 | B1 | 7/2001 | Dupenloup |
| 6,269,467 | B1 | 7/2001 | Chang et al. |
| 6,289,491 | B1 | 9/2001 | Dupenloup |
| 6,289,498 | B1 | 9/2001 | Dupenloup |
| 6,292,931 | B1 | 9/2001 | Dupenloup |
| 6,295,636 | B1 | 9/2001 | Dupenloup |
| 6,324,678 | B1 | 11/2001 | Dangelo et al. |
| 6,356,796 | B1 * | 3/2002 | Spruiell et al. ............. 700/97 |
| 6,367,056 | B1 * | 4/2002 | Lee ............................. 716/5 |
| 6,378,123 | B1 | 4/2002 | Dupenloup |
| 6,421,818 | B1 | 7/2002 | Dupenloup et al. |
| 6,442,739 | B1 | 8/2002 | Palermo et al. |
| 6,453,446 | B1 | 9/2002 | van Ginneken |
| 6,457,166 | B1 | 9/2002 | Shoyama |
| 6,567,957 | B1 | 5/2003 | Chang et al. |
| 6,574,778 | B2 | 6/2003 | Chang et al. |
| 6,581,191 | B1 | 6/2003 | Schubert et al. |
| 6,588,000 | B2 | 7/2003 | Gutwin et al. |
| 6,594,800 | B2 | 7/2003 | Chang et al. |
| 6,629,293 | B2 | 9/2003 | Chang et al. |
| 6,631,470 | B2 | 10/2003 | Chang et al. |
| 6,640,330 | B1 | 10/2003 | Joshi |
| 6,678,644 | B1 | 1/2004 | Segal |
| 6,678,645 | B1 | 1/2004 | Rajsuman et al. |
| 6,684,376 | B1 | 1/2004 | Kerzman et al. |
| 6,687,710 | B1 | 2/2004 | Dey |
| 6,694,501 | B2 | 2/2004 | Chang et al. |
| 6,698,002 | B2 | 2/2004 | Chang et al. |
| 6,701,504 | B2 | 3/2004 | Chang et al. |
| 6,704,891 | B2 * | 3/2004 | Woo et al. ................. 714/718 |
| 6,742,165 | B2 | 5/2004 | Lev et al. |
| 6,763,506 | B1 | 7/2004 | Betz et al. |
| 6,782,514 | B2 | 8/2004 | Bhattacharya et al. |
| 6,820,240 | B2 | 11/2004 | Bednar et al. |
| 6,836,877 | B1 | 12/2004 | Dupenloup |
| 6,857,110 | B1 | 2/2005 | Rupp et al. |
| 6,862,600 | B2 | 3/2005 | Croix et al. |
| 6,877,139 | B2 | 4/2005 | Daga |
| 6,883,152 | B2 | 4/2005 | Bednar et al. |
| 6,901,562 | B2 | 5/2005 | Cooke et al. |
| 2002/0023252 | A1 * | 2/2002 | Lee et al. ...................... 716/6 |
| 2003/0046668 | A1 | 3/2003 | Bowen |
| 2004/0003360 | A1 | 1/2004 | Batchelor et al. |
| 2004/0025129 | A1 | 2/2004 | Batchelor |
| 2004/0088671 | A1 | 5/2004 | Wu et al. |
| 2004/0143801 | A1 | 7/2004 | Waters et al. |
| 2004/0194044 | A1 | 9/2004 | Tanaka |
| 2004/0225991 | A1 | 11/2004 | Fitzhenry et al. |
| 2004/0230933 | A1 | 11/2004 | Weaver et al. |
| 2004/0250224 | A1 | 12/2004 | Clement et al. |
| 2004/0268279 | A1 | 12/2004 | Oleksinski et al. |
| 2005/0010880 | A1 | 1/2005 | Schubert et al. |
| 2005/0086619 | A1 | 4/2005 | Teh et al. |
| 2005/0108674 | A1 | 5/2005 | Darringer et al. |
| 2005/0114811 | A1 | 5/2005 | Schultz |
| 2005/0114818 | A1 | 5/2005 | Khakzadi et al. |
| 2005/0120321 | A1 | 6/2005 | Auracher et al. |

FOREIGN PATENT DOCUMENTS

| | | |
|---|---|---|
| GB | 2321118 | 7/1998 |
| GB | 2406400 | 3/2005 |
| WO | WO-02075611 | 9/2002 |
| WO | WO-03063207 | 7/2003 |
| WO | WO-2004068535 | 8/2004 |

OTHER PUBLICATIONS

Preiss, "An Algorithm for Speculative Parallel Execution of Rendezvous-Synchronized Simulation", Proceedings of Ninth Workshop on Parallel and Distributed Simulation, Jun. 14-16, 1995, pp. 11-20.*

Coussy, P., et al., A Methodology for IP Integration into DSP SoC: A Case Study of a Map Algorithm for Turbo Decoder Acoustics, Speech, and Signal Processing, 2004 Proceedings. (ICASSP '04). IEEE International Conference on Montreal, Quebec, Canada May 17-21, 2004, Piscataway, NJ, USA, IEEE, vol. 5, May 17, 2004. pp. 45-48, XP010718834; ISBN: 0-7803-8484-9.

Abbes F., et al., "IP Integration Methodology for SoC Design" Microelectronics, 2004. ICM 2004 Proceedings. The 16th International Conference on Tunis, Tunisia Dec. 6-8, 2004, Piscataway. NJ, USA, IEEE Dec. 6, 2004, pp. 343-346, XP010800820; ISBN: 0-7803-8656-6.

Doucet F., et al., "Introspection in System-Level Language Frameworks: Meta-Level vs. Integrated" Design, Automation and Test in Europe Conference and Exhibition, 2003 Munich, Germany Mar. 3-7, 2003, Los Alamitos, CA, USA, IEEE Computer Society, US, Mar. 3, 2003, pp. 382-387, XP010673480; ISBN: 0-7695-1870-2.

Author Unavailable, "Logiclock Block-Based Design," Date Unknown, 4 pages.

Author Unknown, "Synpllify ASIC Product," Date Unknown, 4 pages.

Jones, Paula, "First Intelligent Constrint Analyzer; Helps Eliminate Chip Integration Timing Problems," Atrenta Press Council, Apr. 14, 2003, 3 pages.

* cited by examiner

METHOD FOR SPECIFICATION AND INTEGRATION OF REUSABLE IP CONSTRAINTS

CROSS-REFERENCE TO RELATED APPLICATIONS

This patent application claims priority from, and incorporates by reference the entire disclosure of, U.S. Provisional Patent Application No. 60/634,350, filed Dec. 8, 2004. This patent application claims priority from, and incorporates by reference the entire disclosure of, U.S. Provisional Patent Application No. 60/662,709, filed Mar. 16, 2005. This patent application incorporates by reference the entire disclosure of each of U.S. Patent Publication No. 2004/0250224 and U.S. Pat. No. 6,877,139.

TECHNICAL FIELD

The present invention is related to intellectual-property-centric (IP-centric) Application Specific Integrated Circuit (ASIC) design and verification methodologies. More particularly, but not by way of limitation, the present invention is related to methodologies and strategies for efficient integration of external IP static timing analysis (STA) timing and synthesis constraints into ASIC STA verification environments.

BACKGROUND

Growth in the complexity new system-on-chip (SoC) ASICs and shortened project schedules responsive specific market windows are becoming more common trends in ASIC development. Designers currently resort to reuse of existing internal or commercial i.e., third party) IP design blocks as a way to reduce the design productivity gap. In doing so, a design-effort focus has shifted from block creation toward block integration at top-level register transfer level (RTL), synthesis environment, functional verification environment, and STA environment and layout levels.

Project time dedicated to integration and validation of an SoC STA environment is increasing in large part due to the fact that a reusability level of timing-verification-constraint code for IP design blocks is typically virtually zero in current systems. As opposed to the functional verification arena, where the concept of reusable verification IP (VIP) has evolved, reusability is a concept that is largely missing in the current timing-verification landscape.

STA code available from third-party IP design blocks cannot typically be used by an SoC integrator to build a chip-level timing analysis environment in a straightforward and efficient manner. Several issues in particular often hamper this effort:
1) Lack of standardization: Different IP providers follow a variety of formats and coding styles.
2) Limited scope of application: Timing specification embedded in the STA scripts restricts itself to the timing analysis of the IP design block in an isolated context.
3) Poor structure: The STA scripts follow an unstructured coding style where all timing constraints are contained in a single monolithic code block.
4) Incomplete constraining: Missing timing specifications delay the integration process due to additional support rounds required from the IP provider and, in a worst-case scenario, force the SoC integrator to reverse-engineer the design.
5) Inefficient maintenance: Updates in the IP design blocks often trigger a new constraint porting cycle, making maintenance of the SoC STA environment a cumbersome task.

A typical scenario faced by an SoC STA integrator alternates between trying to port existing IP STA constraints by copy-paste and writing missing STA constraints following available IP timing documentation.

ASIC design and verification methodologies based on STA require specification of timing constraints as inputs to an STA analyzer tool. Electronic Design Automation (EDA) vendors develop a user interface of the STA analyzer using a high-level scripting language interpreter. On top of a built-in command set of the scripting language interpreter, EDA vendors develop special-purpose commands intended for timing constraints to be input to the analyzer. In turn, ASIC designers use the special-purpose commands to write scripts for performing STA analysis on hardware (i.e., ASIC) designs.

STA analysis scripts written for a specific hardware block or function constitute an item of a set of deliverables supplied by the IP vendor to a system-on-chip (SoC) integrator. The scope of the STA analysis scripts is typically limited to the isolated hardware block/function only. Therefore, the SoC integrator must adapt (e.g., by rewriting) the STA analysis scripts of the hardware block or function for the integrated SoC context.

Time spent by the SoC integrator building and validating the consistency of a chip-level timing analysis environment often negatively impacts an ASIC project schedule to a significant degree. An ASIC project schedule is fixed every time a new product development cycle starts. Typical ASIC project schedules are becoming shorter due to a common trend of resorting more to third-party IP hardware blocks or functions.

SUMMARY OF THE INVENTION

A hardware-block constraint specification method includes defining a plurality of hardware-block timing-constraint categories according to at least one of type of timing constraint and timing-constraint operating mode and defining a plurality of hardware-block timing-constraint commands. Each of the plurality of hardware-block timing-constraint commands is categorized into one of the plurality of hardware-block timing-constraint categories. The method also includes encapsulating the plurality of hardware-block timing-constraint commands within a plurality of modules usable, via an application programming interface, in a stand-alone mode or an integrated mode.

An integrated-circuit analysis method includes integrating, via an application programming interface, a plurality of hardware-block timing-constraint modules into an electronic-design-automation environment. At least one of the plurality of hardware-block timing-constraint modules is usable in a stand-alone mode or an integrated mode. The method also includes performing a timing analysis using the at least one of the plurality of hardware-block timing-constraint modules.

An article of manufacture for hardware-block timing-constraint specification includes at least one computer readable medium and processor instructions contained on the at least one computer readable medium, the processor instructions configured to be readable from the at least one computer readable medium by at least one processor and cause the at least one processor to operate as to facilitate definition of a plurality of hardware-block timing-constraint categories according to at least one of type of timing constraint and timing-constraint operating mode. The processor instructions are also configured to facilitate definition of a plurality of hardware-block timing-constraint commands. Each of the plurality of hardware-block timing-constraint commands is categorized into one of the plurality of hardware-block timing-constraint categories. The processor instructions are also configured to facilitate encapsulation of the plurality of hardware-block timing-constraint commands within a plurality of modules usable, via an application programming interface, in a stand-alone mode or an integrated mode.

A hardware-block synthesis-constraint specification method includes defining a plurality of hardware-block synthesis-constraint categories. The hardware-block synthesis-constraint categories are defined according to at least one of type of constraint and constraint operating mode. The method also includes defining a plurality of hardware-block synthesis-constraint commands. Each of the plurality of hardware-block synthesis-constraint commands is categorized into one of the plurality of hardware-block synthesis-constraint categories. The method also includes encapsulating the plurality of hardware-block synthesis-constraint commands within a plurality of modules usable, via an application programming interface, in a stand-alone mode or an integrated mode.

An article of manufacture for integrated-circuit timing analysis includes at least one computer readable medium and processor instructions contained on the at least one computer readable medium. The processor instructions are configured to be readable from the at least one computer readable medium by at least one processor and thereby cause the at least one processor to operate as to facilitate integration, via an application programming interface, of a plurality of hardware-block timing-constraint modules into an electronic-design-automation environment. At least one of the plurality of hardware-block timing-constraint modules is usable in a stand-alone mode or an integrated mode. The processor instructions are also configured to facilitate performance of a timing analysis using the at least one of the plurality of hardware-block timing-constraint modules.

An integrated-circuit synthesis method includes integrating, via an application programming interface, a plurality of hardware-block synthesis-constraint modules into an electronic-design-automation environment. At least one of the plurality of hardware-block synthesis-constraint modules is usable in a stand-alone mode or an integrated mode. the method also includes performing a synthesis using the at least one of the plurality of hardware-block synthesis-constraint modules.

An article of manufacture for integrated-circuit synthesis includes at least one computer readable medium and processor instructions contained on the at least one computer readable medium. The processor instructions are configured to be readable from the at least one computer readable medium by at least one processor and thereby cause the at least one processor to operate as to facilitate integration, via an application programming interface, of a plurality of hardware-block synthesis-constraint modules into an electronic-design-automation environment. At least one of the plurality of hardware-block synthesis-constraint modules is usable in a stand-alone mode or an integrated mode. The processor instructions are also configured to facilitate performance of a synthesis using the at least one of the plurality of hardware-block synthesis-constraint modules.

An article of manufacture for hardware-block synthesis-constraint specification, the article of manufacture includes at least one computer readable medium and processor instructions contained on the at least one computer readable medium. The processor instructions are configured to be readable from the at least one computer readable medium by at least one processor and cause the at least one processor to operate as to facilitate definition of a plurality of hardware-block synthesis-constraint categories. The hardware-block synthesis-constraint categories are defined according to at least one of type of constraint and constraint operating mode. The processor instructions are also configured to facilitate definition of a plurality of hardware-block synthesis-constraint commands. Each of the plurality of hardware-block synthesis-constraint commands is categorized into one of the plurality of hardware-block synthesis-constraint categories. The processor instructions are also configured to facilitate encapsulation of the plurality of hardware-block synthesis-constraint commands within a plurality of modules usable, via an application programming interface, in a stand-alone mode or an integrated mode.

A hardware-block constraint specification method includes defining a plurality of hardware-block constraint categories according to at least one of type of constraint and constraint operating mode and defining a plurality of hardware-block constraint commands. Each of the plurality of hardware-block constraint commands is categorized into one of the plurality of hardware-block constraint categories. The method also includes encapsulating the plurality of hardware-block constraint commands within a plurality of modules usable, via an application programming interface, in a stand-alone mode or an integrated mode.

An article of manufacture for hardware-block constraint specification includes at least one computer readable medium and processor instructions contained on the at least one computer readable medium, the processor instructions configured to be readable from the at least one computer readable medium by at least one processor and cause the at least one processor to operate as to facilitate definition of a plurality of hardware-block constraint categories according to at least one of type of constraint and constraint operating mode. The processor instructions are also configured to facilitate definition of a plurality of hardware-block constraint commands. Each of the plurality of hardware-block constraint commands is categorized into one of the plurality of hardware-block constraint categories. The processor instructions are also configured to facilitate encapsulation of the plurality of hardware-block constraint commands within a plurality of modules usable, via an application programming interface, in a stand-alone mode or an integrated mode.

DETAILED DESCRIPTION OF ILLUSTRATIVE EMBODIMENTS OF THE INVENTION

In various embodiments of the invention, timing constraints for IP hardware functions or blocks are organized and coded as a set of procedures, functions, classes, data structures, and tools, following a structured programming methodology. A collection of elements constitutes a well-defined application programming interface (API) that allows the SoC integrator to build a chip-level timing analysis setup quickly and efficiently. Although much of the following discussion is in the context of IP timing constraints, those having skill in the art will appreciate that principles of the present invention may be applied in analogous fashion to IP synthesis constraints. Timing constraints may be used independently of or as a subset of synthesis constraints. The term synthesis constraints refers to a tool command set provided by an EDA synthesis-tool vendor. An end-user writes scripts based on the tool command set that serve as inputs to the synthesis tool.

The synthesis process includes taking a language description of an integrated circuit and a script with synthesis constraints and generating a new IC representation, for example, as a netlist of logic gates (i.e., RTL synthesis) or a netlist of placed logic gates already arranged in a geometrical layout (i.e., physical synthesis).

The synthesis constraints specify, among other parameters, target silicon technology, design rule constraints (e.g., max/min capacitance, max/min transition), area constraints (e.g., max area), power constraints (e.g., leakage & dynamic power), layout constraints (e.g., layout regions) and timing constraints.

In the context of the present invention, the term modularity includes two quality factors of interest: reusability and extendibility. Reusability refers to the ability of IP STA constraint elements to be used in construction of different SoC STA environments. Extendibility refers to the ease of adapting IP STA constraints to IP block or function design changes. Both reusability and extendibility suggest an SoC STA environment based on a flexible decentralized architecture made up of modular elements that communicate through a restricted and well-defined interface. A process for developing a set of constraint modules should take into account both composability and continuity.

Composability refers to the process favoring extraction of constraint modules from a context for which they were originally developed (i.e., stand-alone STA) in order to use them again in a SoC-level integrated context. A direct example of composability comes from the notion of IP constraint libraries to be used by IP integrators to build STA environments.

Continuity refers to changes that affect individual modules, but leave a structure of the SoC STA environment unaltered. Continuity may be better understood by analyzing a typical case for constant handling. Constant handling means that numerical and textual constants (e.g., input delay values or clock names) are referenced using symbolic names (e.g., a Tcl variable) and are located in a single module, which serves to limit updates to only the single module.

Appendix 1 illustrates public data structures for use in creating an API in accordance with principles of the invention. Various variables are illustrated symbolically (e.g., id_max_typ1, id_min_typ1), use of the symbolic variable names facilitating an API concept in accordance with principles of the invention.

Appendix 1 defines three public shared data structures: 1) myIPStaParam; 2) myIPIports; and 3) myIPOports. myIPIports and myIPOports define port groups that share similar timing characteristics. myIPStaParam contains miscellaneous parameters, such as numerical values and design object names.

Regarding communication between modules, the information hiding (encapsulation) rule, which emphasizes separation of function from implementation, has certain advantages.

In the information hiding (encapsulation) rule, a constraint-module developer selects a subset of the constraint-module properties as the official public information about the module to be made available to integrators of SoC STA environments. The public information could be related, for example, to design objects (e.g. clocks, ports, pins) that may be affected when moving from a stand-alone STA context to an integrated STA context. The design objects could be detailed in a public data structure (e.g., Tcl array); however, public properties are not necessarily restricted to data arguments, as in the case of public helper functions (procedures) to retrieve information such as ideal nets or internally-generated clocks. Constraint procedures and the public data structures together form an API for myIP.

Figure 1:
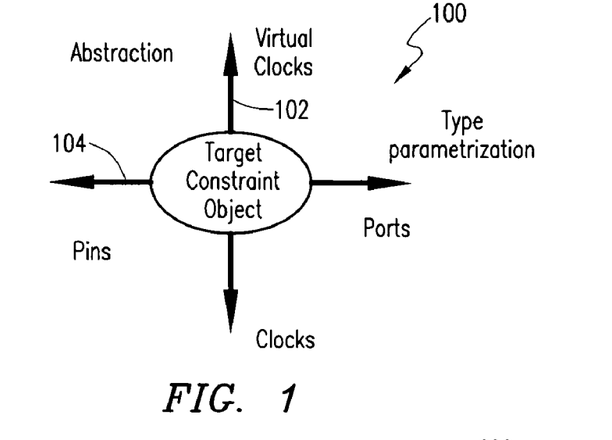
FIG. 1 is a diagram 100 illustrating degrees of freedom resulting from the generic nature of design objects.

FIG. 1 is a diagram 100 illustrating degrees of freedom resulting from the generic nature of design objects. In the process of improving the flexibility of constraint modules, the degrees of freedom resulting from the generic nature of the design objects may be exploited. The degrees of freedom exist in two dimensions, as illustrated in the diagram 100. A vertical axis 102 represents an abstraction dimension, while a horizontal axis 104 represents type parameterization. From a timing point of view, a virtual clock could be considered an abstract entity, which may contain a real clock (i.e., neighboring clock domain) or remain unchanged (i.e., I/O constraining) once the STA context has been raised to an integrated level. Likewise, the genericity of design objects can be illustrated with an obvious example in which port objects in the stand-alone context become pin objects in the integrated context.

Figure 2:
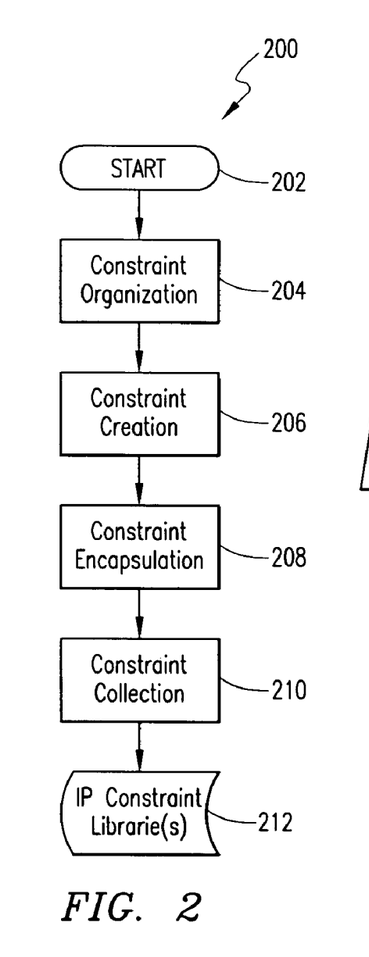
FIG. 2 is a flow diagram illustrating a reusable-IP timing-constraint development process.

FIG. 2 is a flow diagram illustrating a reusable-IP timing-constraint specification process 200. The process 200 starts at step 202. From step 202, execution proceeds to step 204. At step 204, constraint organization occurs. Step 204 includes partitioning of timing constraints related to a hardware block or function. The partitioning is performed observing at least two levels of granularity. The at least two levels of granularity may, for example, include: 1) type of constraint; and 2) operating mode.

The partitioning by type of constraint may, for example, be used to classify the timing constraints by function into: 1) clock constraints; 2) input/output (I/O) constraints; 3) timing exceptions; and 4) environmental constraints. The clock constraints specify clock signals and their attributes. The I/O constraints specify the timing behavior of the block or function interfaces. The timing exceptions specify asynchronous behavior characteristics or single-cycle path-propagation-rule exemptions. The environmental constraints specify timing characteristics dependent, for example, on temperature, supply voltage, and fabrication process variations.

The partitioning by operating mode may be used to classify the timing constraints relative to a plurality of specific operating modes of the hardware block or function. For example, the operating-mode partitioning may be used to classify the timing constraints into test timing constraints and functional timing constraints.

From step 204, execution proceeds to step 206. At step 206, constraint creation occurs. The constraint creation includes writing the timing-constraint commands using a style that is usage-context (i.e., stand-alone and SoC integrated) aware. Achieving a usage-context-aware style may be achieved, for example, by data abstraction, polymorphism, or parameterization. In data abstraction, virtual objects (e.g., virtual clocks) are used to represent entities to be derived from an integrated context. In polymorphism, special commands are used to manage multiple object types. Objects subject to constraints may change object type depending on the usage context. For example, the interface of a stand-alone block may be composed of objects of object type "port." Once the block is integrated into the SoC, the object type may be changed to "pin." In parameterization, usage-context-dependant constraint objects are stored in a suitable data structure.

From step 206, execution proceeds to step 208. At step 208, constraint encapsulation occurs. The constraint encapsulation includes creating an API for the user (i.e., SoC integrator) via a suitable modularization mechanism. Examples of suitable modularization mechanisms may be obtained from common practices of procedural programming (e.g., packages of procedures, namespaces) and also object-oriented programming (OOP). From step 208, execution proceeds to step 210. At step 210, constraint collection occurs. The constraint collection includes assembly of the modules resulting from step 208 into libraries. At step 212, constraint library packages resulting from the process 200 are available for use by, for example, an IP integrator.

Table 1 lists possible conversions for target constraint design objects:

TABLE 1

| STA stand-alone context Object | STA integrated context Object |
| --- | --- |
| cell | lower hierarchy cell |
| clock | clock |
| virtual clock | clock (top-level), or virtual clock (I/O constraining) |
| net | lower hierarchy net |
| pin | lower hierarchy pin |
| port | lower hierarchy pin |
| design | remain unchanged |
| lib | |
| lib_cell | |
| lib_pin | |
| timing_arc | |
| lib_timing_arc | |

In various embodiments of the invention, constraints are dependent on STA context integration. As shown in Table 1, ports are the only objects subject to a type change. The virtual clocks may become real top-level clocks, assuming a more specialized variant, or remain unchanged to serve as I/O constraining aids. Nets, pins, and cells are referenced using a longer name due to an increase in hierarchy levels; however, their selection can still be handled easily in multi-context STA using predefined EDA tool commands.

As with design objects, dependencies that affect the coding style are significant, especially on constraints related to interface of the IP design block. In IP STA scripts, it is typical to find exceptions on ports declared with the following code:

```
set_false_path-from [get_ports my_input_port]
set_false_path-to [get_ports my_output_port]
```

The constraints set forth immediately above may be sufficient in an isolated STA context; however, when viewed from an integrated context, they are incomplete.

Figure 3:
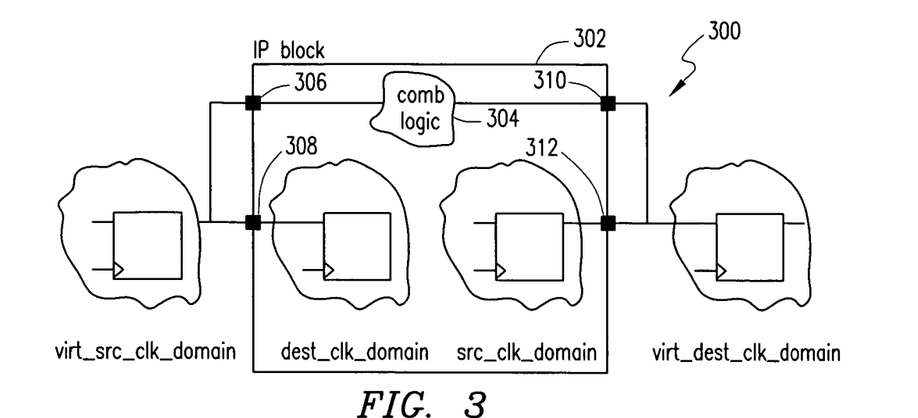
FIG. 3 illustrates a typical scenario beyond the boundaries of an IP block interface.

FIG. 3 illustrates a typical scenario beyond the boundaries of an IP block interface. A diagram 300 includes an IP block 302. The IP block 302 includes combinational logic 304 as well as input ports 306 and 308 and output ports 310 and 312. To make interface constraints robust and suitable for integration, a coding style should take into account surroundings of the IP design block. For example, the following illustrative constraints show how the surroundings of the IP block 302 may be taken into account:

```
set_false_path-from [get_clocks virt_src_domain_clk]
    through [get_ports my_input_port]
    to [get_clocks dest_domain_clk]
set_false_path-from [get_clocks src_domain_clk]
    through [get_ports my_output_port]
    to [get_clocks virt_dest_domain_clk]
```

Figure 4:
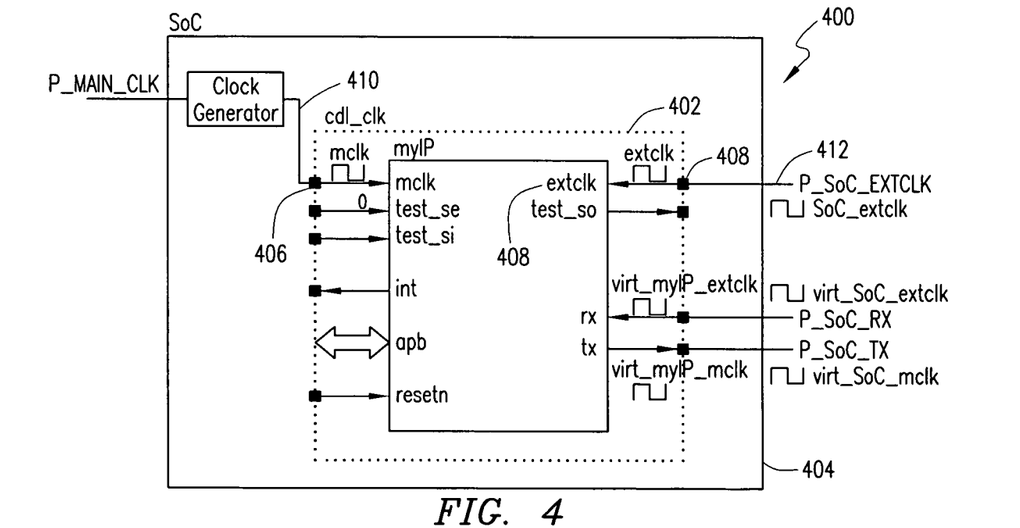
FIG. 4 is a block diagram that illustrates a reference model exemplifying several techniques in accordance with principles of the invention.

FIG. 4 is a block diagram 400 that illustrates a reference model that will be used to exemplify several techniques in accordance with principles of the invention. In FIG. 4, a third-party IP design block myIP 402 is shown integrated into an SoC ASIC 404. Timing of myIP 402 is determined principally by clocks mclk 406 and extclk 408, the clock mclk 406 and the clock extclk 408 being asynchronous relative to one another. Block interfaces to the SoC ASIC 404 via several groups of signals are also shown: test signals (e.g., test_*); bus signals (e.g., apb); external data signals (e.g., rx & tx); HFO signals (e.g., resetn & test_se); and an asynchronous interrupt int. Virtual clocks (e.g., virt_*) serve to constrain I/O delays. Actual clock sources for the clocks 406 and 408 are derived from an internal SoC clock cdl_clk 410 and an external SoC clock SoC_extclk 412, respectively.

Figure 5:
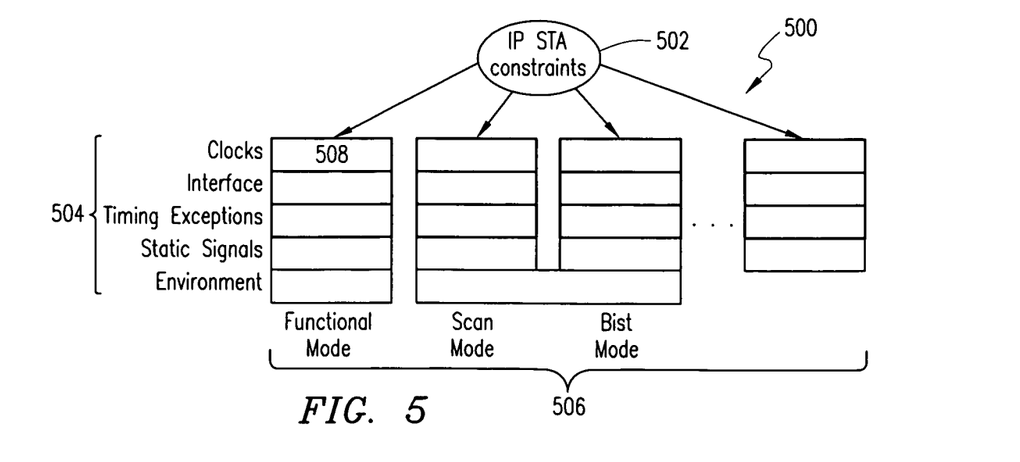
FIG. 5 illustrates a constraint-partitioning strategy useful in achieving a modular architecture.

FIG. 5 illustrates a constraint partitioning strategy useful in achieving a modular architecture. As shown in a diagram 500, IP STA constraints 502 may be partitioned observing two levels of granularity: 1) type of constraint 504; and 2) operating mode 506. Possible constraint type groups may be determined, for example, by function: 1) clocks; 2) interface; 3) timing exceptions; 4) static signals; and 5) environment. Functional timing constraints for clocks are shown, for example, in block 508. An illustrative distribution of SDC constraints is listed in Table 2. Different operating modes 506 supported by the IP design block could define operating mode sets, such as, for example, functional timing constraints and test timing constraints. The test timing constraints could include, for example, scan and built-in self test (bist) timing constraints.

TABLE 2

| Type Group | SDC constraint |
| --- | --- |
| Clocks | create_clock |
|  | create_generated_clock |
|  | set_clock_gating_check |
|  | set_clock_latency |
|  | set_clock_transition |
|  | set_clock_uncertainty |
|  | set_propagated_clock |
|  | set_max_time_borrow |
| Interface | set_input_delay |
|  | set_output_delay |
| Timing Exceptions | set_disable_timing |
|  | set_false_path |
|  | set_max_delay |
|  | set_min_delay |
|  | set_multicycle_path |
| Static Signals | set_case_analysis |
| Environment | set_operating_conditions |
|  | set_wire_load_model |
|  | set_wire_load_mode |
|  | set_wire_load_selection_group |
|  | set_drive |
|  | set_driving_cell |
|  | set_fanout_load |
|  | set_input_transition |

TABLE 2-continued

| Type Group | SDC constraint |
| --- | --- |
|  | set_load |
|  | set_max_capacitance |
|  | set_max_transition |
|  | set_min_capacitance |

Appendix 2 shows illustrative code for defining a functional timing constraint for clocks 508 (i.e., myIPclocksFunc). In Appendix 2, Opcond is an parameter input to myIPclocksFunc that may have values such as min, max, or min_max as shown in the code of Appendix 2. create_clock and set_clock_transition are examples of timing constraint commands for a particular clock that are provided by an STA tool and used to create an STA. It will also be apparent to those having skill in the art that a plurality of timing constraint commands are encapsulated via an encapsulation command shown as proc: :acme: :myIPClocksPunc. The open bracket immediately following Opcond (i.e., {) designates the beginning of the constraints that are encapsulated, while the close bracket (i.e.,}) indicates the end of the constraints that are encapsulated. The encapsulated code is indicated by bolded text. In Appendix 3, which shows illustrative code for an IP constraint loader in standalone mode, proc: :acme: :myIPClocksFunc, which has been previously encapsulated to result in an abstraction to the user, does not reveal the encapsulated code to a user in accordance with principles of the present invention. To use proc: :acme: :myIPClocksFunc, the user needs only to provide the OpCond parameter value; underlying details are transparent to the user.

In Appendix 3, proc: :acme: :MyIPConstraintLoader has two associated parameters, Mode and OpCond. Thus, the user may specify, for example, that the value of Mode is func and the value of OpCond is min. No further parameters need to be provided by the user relative to this process.

Appendix 4 shows illustrative code for a System-on-Chip (SoC) constraint loader. The code shown in Appendix 4 illustrates reuse of the standalone-mode processes shown in Appendix 3 in an integrated mode on a system on chip. In Appendix 4, parameters for a plurality of virtual clocks are defined by using the public data structure shown in Appendix 1 and assigning new values thereto that are relevant for the system on chip in question. Next, virtual clocks are created in an analogous fashion to the virtual-clock creation in standalone mode illustrated in Appendix 3. The remaining processes illustrated in Appendix 4 will be apparent to those having skill in the art.

Figure 6:
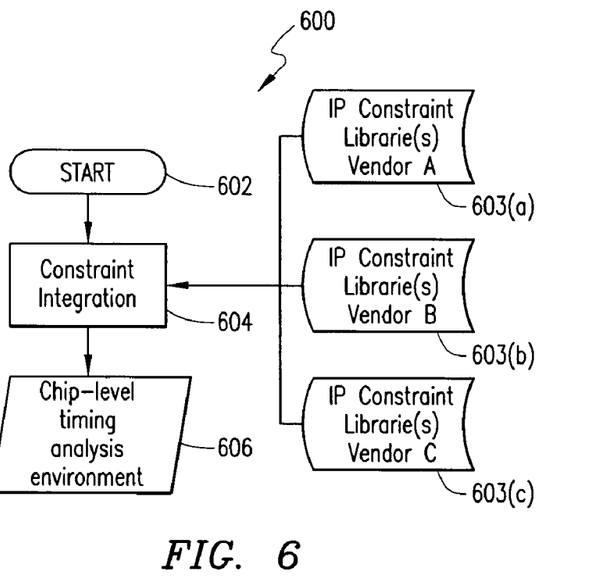
FIG. 6 is a flow diagram illustrating an integration process that may be used by a SoC integrator.

FIG. 6 is a flow diagram illustrating an integration process 600 that may be used by a SoC integrator. The integration process 600 begins at step 602. From step 602, execution proceeds to step 604. At step 604, constraints created and included in an IP constraint library via, for example, the process 200 are integrated into an SoC STA environment. The constraint integration performed at step 604 includes integration of IP constraint library(ies) from at least one vendor, integration of constraints 603(*a*), 603(*b*), and 603(*c*) from vendors A, B, and C, respectively, being illustrated. From step 604, execution proceeds to step 606. At step 606, a chip-level timing analysis is performed in the SoC STA environment.

Figure 7:
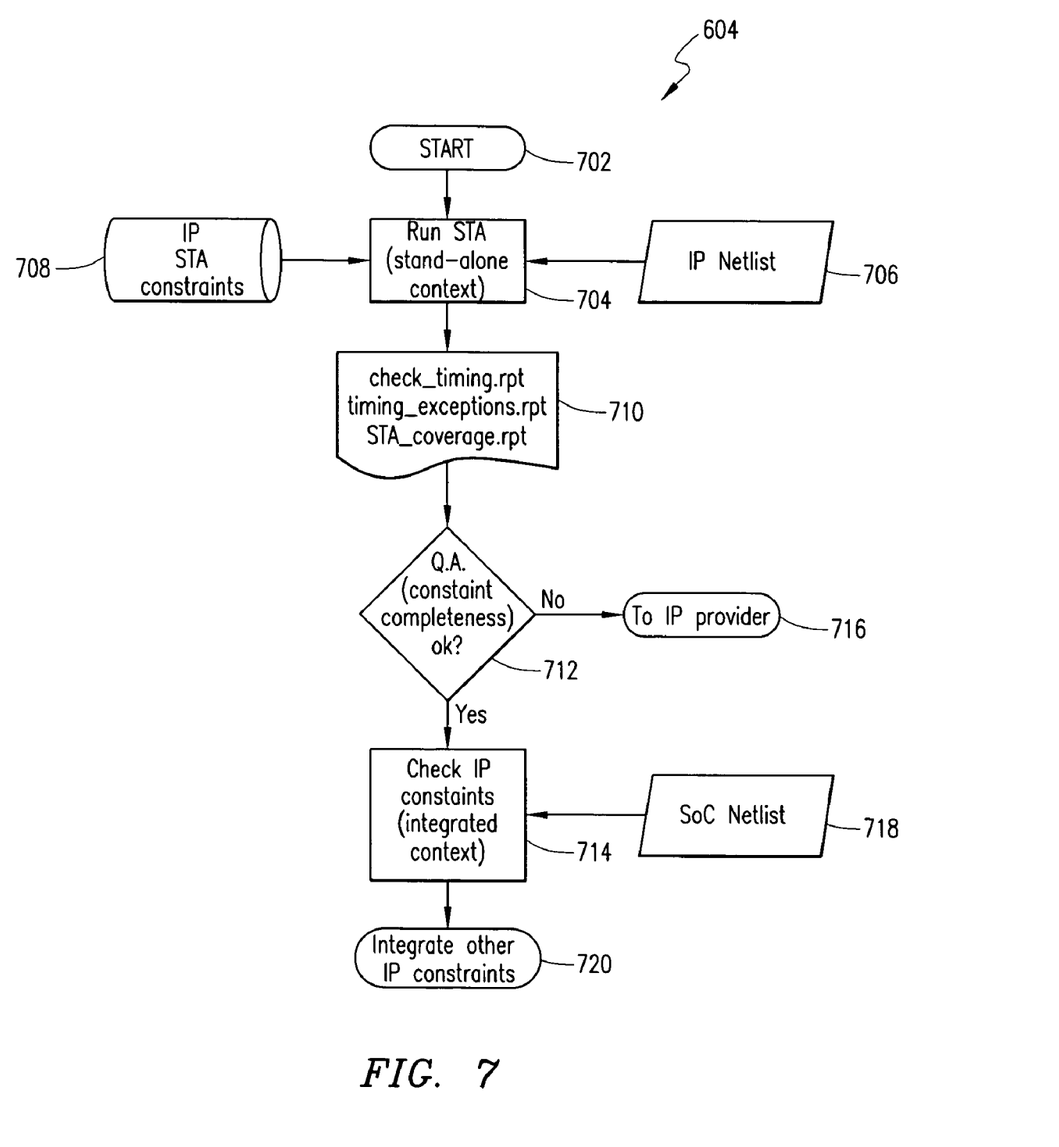
FIG. 7 is a flow diagram illustrating in greater detail the constraint integration 604 of FIG. 6.

FIG. 7 is a flow diagram illustrating in greater detail the constraint integration 604 of FIG. 6. The constraint integration process 604 begins at step 702, at which step the process begins. From step 702, execution proceeds to step 704. At step 704, a stand alone STA check is performed using a trial block level IP netlist 706 and IP STA constraints package 708 included in IP delivery from an IP provider.

From step 704, execution proceeds to step 710. At step 710, a number of reports may be generated, including reports relative to ports, clocks, static signals, disabled timing arcs, declared timing exceptions, STA analysis coverage, and miscellaneous timing checks. The ports reports typically include loads and driving cells, driving cell input transitions, input/output delays, and related clocks. The clocks reports typically include type, period, duty cycle, sources, skew, latency, transition times, and clock groups. The declared timing exceptions reports typically include ignored timing exceptions. The STA analysis coverage reports typically include details for untested and violated timing paths. The miscellaneous timing checks reports typically include clock domain crossings, generated clock network, unmapped cells in the design, latch fanout, combinational feedback loops, unclocked registered, missing input delays, and unconstrained timing endpoints.

From step 710, execution proceeds to step 712. At step 712, a constraint-completeness assessment is made based on one or more of the reports of step 710. If it is determined that constraint-completeness is adequate, execution proceeds to step 714. At step 714, the IP constraints are checked in an integrated context using an SoC netlist 718 and the IP STA constraints 708. From step 714, execution proceeds to step 720. At step 720, other IP constraints are integrated. If, at step 712, constraint-completeness is not determined to be adequate, execution proceeds to step 716, at which step information regarding the inadequacy of constraint completeness is provided to the IP provider.

Embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory).

It should be emphasized that the terms "comprise", "comprises", and "comprising", when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

Appendix 1: Public Data Structures

```
#----------------------------------------------------------------------
# File        : myIPStaParams.tcl
# Created     :
# Revision    :
# Description :
# Modifications :
package provide acme 1.0
namespace eval ::acme:: {
    namespace export {[a-z]*}
    variable myIPStaParam
```

-continued

```
}
proc ::acme::myIPStaParams { } {
    echo "\n--> Defining STA parameters for myIP (ACME)"
    variable myIPStaparam
    array set myIPStaParam {
        id_max_typ1       2
        id_min_typ1       1
        od_max_typ1       4
        od_min_typ1       1
        od_max_typ2       3
        od_min_typ2       1
        clk_name_mclk     mclk
        clk_per_mclk      20
        clk_wav_mclk      [list 0 10]
        clk_name_extclk   extclk
        clk_per_extclk    40
        clk_wav_extclk    [list 0 20]
        virt_clk_name_mclk    "virt_myIP_mclk"
        virt_clk_name_extclk  "virt_myIp_extclk"
        virt_clk_name_int     "virt_myIP_extclk"
        clk_transition_min    0.123
        clk_transition_max    0.123
        uncertainty_min_mclk  0.123
        uncertainty_max_mclk  0.123
        uncertainty_min_extclk 0.123
        uncertainty_max_extclk 0.123
        latency_min_mclk      1
        latency_max_mclk      2
        latency_min_extclk    1
        latency_max_extclk    3
        idl_transition_min    0.123
        idl_transition_max    0.123
        latency_min_resetn    1
        latency_max_resetn    2
        latency_min_scan_en   1
        latency_max_scan_en   3
        stdcell_lib     "mystdcelllib"
        lib_cell        "BUFXYZ"
        lib_pin         "OUT"
```

-continued

```
        load_min 0.123
        load_max 0.456
    }
}
#----------------------------------------------------------------------
# File           : myIPStaportGroups.tcl
# Created        :
# Revision       :
# Description    :
# Modifications  :
package provide acme 1.0
namespace eval ::acme:: {
    namespace export {[a-z]*}
    variable myIPIports
    variable myIPOports
}
proc ::acme::myIPStaPortGroups { } {
    echo "\n--> Defining STA port groups for myIP (ACME)"
    variable myIPIports
    variable myIPOports
    set myIPIports(mclk)     [get_ports mclk]
    set myIPIports(extclk)   [get_ports extclk]
    set myIPIports(reset)    [get_ports resetn]
    set myIPIports(rx)       [get_ports rx]
    set myIPIports(apb)      [get_ports {penable paddr pwdata pwrite psel}]
    set myIPIports(scan)     [get_ports {test_si}]
    set myIPIports(scan_en)  [get_ports {test_se}]
    set TempIportCol [list $myIPIports(mclk) $myIPIports(extclk) $myIPIports(reset) $myIPIports(scan_en)]
    set myIPIports(default)  [remove_from_collection [all_inputs] $TempIportCol]
    set myIPOports(int)      [get_ports int]
    set myIPOports(apb)      [get_ports prdata]
    set myIPOports(tx)       [get_ports tx]
    set myIPOports(scan)     [get_ports {test_so}]
}
```

Appendix 2: Clock Constraints

```
#----------------------------------------------------------------------
# File           : myIPClocksFunc.tcl
# Created        :
# Revision       :
# Description    :
# Modifications  :
package provide acme 1.0
namespace eval ::acme:: {
    namespace export {[a-z]*}
}
proc ::acme::myIPClocksFunc {Opcond} {
    echo "\n--> Defining Clocks for myIP FUNC (ACME)"
    variable myIPStaParam
    variable myIPIports
    variable myIPOports
    if {[string equal "myIP" [get_object_name [current_design]]]} {
        # IP Block clocks which will be derived from top after integration are not reused....
        create_clock -period $myIPStaParam(clk_per_mclk) -waveform $myIPStaParam(clk_wav_mclk) -name $myIPStaParam(clk_name_mclk) $myIPIports(mclk)
        create_clock -period $myIPStaParam(clk_per_extclk) -waveform $myIPStaParam(clk_wav_extclk) -name $myIPStaParam(clk_name_extclk) $myIPIports(clk_extclk)
        switch -exact -- $Opcond {
            min {
                set_clock_transition $myIPStaParam(clk_transition_min) [get_clocks $myIPStaParam(clk_name_mclk)]
                set_clock_transition $myIPStaParam(clk_transition_min) [get_clocks $myIPStaParam(clk_name_extclk)]
                set_clock_uncertainty $myIPStaParam(uncertainty_min_mclk) [get_clocks $myIPStaParam(clk_name_mclk)]
                set_clock_uncertainty $myIPStaParam(uncertainty_min_extclk) [get_clocks $myIPStaParam(clk_name_extclk)]
                set_clock_latency $myIPStaParam(latency_min_mclk) [get_clocks
```

-continued

```
$myIPStaParam(clk_name_mclk)]
                set_clock_latency $myIPStaParam(latency_min_extclk) [get_clocks $myIPStaParam(clk_name_extclk)]
            }
            max {
                set_clock_transition $myIPStaParam(clk_transition_max) [get_clocks $myIPStaParam(clk_name_mclk)]
                set_clock_transition $myIPStaParam(clk_transition_max) [get_clocks $myIPStaParam(clk_name_extclk)]
                set_clock_uncertainty $myIPStaParam(uncertainty_max_mclk) [get_clocks $myIPStaParam(clk_name_mclk)]
                set_clock_uncertainty $myIPStaParam(uncertainty_max_extclk) [get_clocks $myIPStaparam(clk_name_extclk)]
                set_clock_latency $myIPStaParam(latency_max_mclk) [get_clocks $myIPStaParam(clk_name_mclk)]
                set_clock_latency $myIPStaParam(latency_max_extclk) [get_clocks $myIPStaParam(clk_name_extclk)]
            }
            min_max {
                set_clock_transition -min $myIPStaParam(clk_transition_min) [get_clocks $myIPStaParam(clk_name_mclk)]
                set_clock_transition -max $myIPStaParam(clk_transition_max) [get_clocks $myIPStaParam(clk_name_mclk)]
                set_clock_transition -min $myIPStaParam(clk_transition_min) [get_clocks $myIPStaParam(clk_name_extclk)]
                set_clock_transition -max $myIPStaParam(clk_transition_max) [get_clocks $myIPStaParam(clk_name_extclk)]
                set_clock_uncertainty -hold $myIPStaParam(uncertainty_min_mclk) [get_clocks $myIPStaParam(clk_name_mclk)]
                set_clock_uncertainty -setup $myIPStaParam(uncertainty_max_mclk) [get_clocks $myIPStaParam(clk_name_mclk)]
                set_clock_uncertainty -hold $myIPStaParam(uncertainty_min_extclk) [get_clocks $myIPStaParam(clk_name_extclk)]
                set_clock_uncertainty -setup $myIPStaParam(uncertainty_max_extclk) [get_clocks $myIPStaParam(clk_name_extclk)]
                set_clock_latency -min $myIPStaParam(latency_min_mclk) [get_clocks $myIPStaParam(clk_name_mclk)]
                set_clock_latency -max $myIPStaParam(latency_max_mclk) [get_clocks $myIPStaParam(clk_name_mclk)]
                set_clock_latency -min $myIPStaParam(latency_min_extclk) [get_clocks $myIPStaParam(clk_name_extclk)]
                set_clock_latency -max $myIPStaParam(latency_max_extclk) [get_clocks $myIPStaParam(clk_name_extclk)]
            }
            default {
                echo "Error: Unknown Operating Condition: $Opcond"
                return 0
            }
        }
    }
    # Virtual clocks can be valid at both analysis contexts (I/O constraining)
    create_clock -period $myIPStaParam(clk_per_mclk) -waveform $myIPStaParam(clk_wav_mclk) -name $myIPStaParam(virt_clk_name_mclk)
    create_clock -period $myIPStaParam(clk_per_extclk) -waveform $myIPStaParam(clk_wav_extclk) -name $myIPStaParam(virt_clk_name_extclk)
    switch -exact -- $Opcond {
        min {
            set_clock_latency $myIPStaParam(latency_min_mclk) [get_clocks $myIPStaParam(virt_clk_name_mclk)]
            set_clock_latency $myIPStaParam(latency_min_extclk) [get_clocks $myIPStaParam(virt_clk_name_extclk)]
        }
        max {
            set_clock_latency $myIPStaParam(latency_max_mclk) [get_clocks $myIPStaParam(virt_clk_name_mclk)]
            set_clock_latency $myIPStaParam(latency_max_extclk) [get_clocks $myIPStaParam(virt_clk_name_extclk)]
        }
        min_max {
            set_clock_latency -min $myIPStaParam(latency_min_mclk) [get_clocks $myIPStaParam(virt_clk_name_mclk)]
            set_clock_latency -max $myIPStaParam(latency_max_mclk) [get_clocks $myIPStaParam(virt_clk_name_mclk)]
            set_clock_latency -min $myIPStaParam(latency_min_extclk) [get_clocks $myIPStaParam(virt_clk_name_extclk)]
            set_clock_latency -max $myIPStaParam(latency_max_extclk) [get_clocks
```

-continued

```
$myIPStaParam(virt_clk_name_extclk)]
            }
            default {
                echo "Error: Unknown Operating Condition: $Opcond"
                return 0
            }
        }
    }
}
```

Appendix 3: IP Constraint Loader

```
#-----------------------------------------------------------------------
# File           : myIPConstraintLoader.tcl
# Created        :
# Revision       :
# Description    : stand-alone constraint loader for myIP
# Modifications  :
package provide acme 1.0
namespace eval ::acme:: {
    namespace export {[a-z]*}
}
proc ::acme::myIPConstraintLoader { Mode Opcond } {
    echo "\n--> Loading constraints for myIP (ACME)
    mode = $Mode, operating condition = $Opcond"
    ::acme::myIPStaParams
    ::acme::myIPStaPortGroups
    ::acme::myIPEnvironment $Opcond
    switch -exact -- $Mode {
        func {
            ::acme::myIPStaticSignalsFunc
            ::acme::myIPClocksFunc $Opcond
            ::acme::myIPInterfaceFunc $Opcond
            ::acme::myIPTimingExceptionsFunc
        }
        scan {
        }
        bist {
        }
        default {
            echo "Error: Unknown Operating Mode: $Mode"
            return 0
        }
    }
}
```

Appendix 4: SoC Constraint Loader

```
#-----------------------------------------------------------------------
# File           : socConstraintLoader.tcl
# Created        :
# Revision       :
# Description    : SoC constraint loader for IP constraint modules
# Modifications:
package provide emp 1.0
namespace eval ::emp:: {
    namespace export {[a-z]*}
}
proc ::emp::socConstraintLoader {Mode Opcond} {
    echo "\n--> Loading constraints for SoC: mode = $Mode,
    operating condition = $Opcond"
    # Defining the parameters for the virtual clocks
    set ::acme::myIPStaParam(virt_clk_name_mclk)    virt_SoC_mclk
    set ::acme::myIPStaParam(virt_clk_name_extclk)  virt_SoC_extclk
    set ::acme::myIPStaParam(clk_per_mclk)          50
    set ::acme::myIPStaParam(clk_per_extclk)        100
    set ::acme::myIPStaParam(clk_wav_mclk)          {0 25}
    set ::acme::myIPStaParam(clk_wav_extclk)        {0 50}
    set ::acme::myIPStaParam(latency_min_mclk)      1
    set ::acme::myIPStaParam(latency_min_extclk)    1
    set ::acme::myIPStaParam(latency_max_mclk)      5
    set ::acme::myIPStaParam(latency_max_extclk)    6
    # Creating the virtual clocks
    ::acme::myIPClocksFunc $Opcond
    # Defining the I/O delays at SoC level
    set ::acme::myIPStaParam(id_max_typ1) 5
    set ::acme::myIPStaParam(id_min_typ1) 1
    set ::acme::myIPStaParam(od_max_typ2) 6
    set ::acme::myIPStaParam(od_min_typ2) 1
    # Selecting which ports will receive I/O constraints
    set ::acme::myIPIports(rx) [get_ports P_SoC_RX]
    set ::acme::myIPOports(tx) [get_ports P_SoC_TX]
    # Setting the I/O delays
    ::acme::myIPInterfaceFunc $Opcond
    # Configuring the SoC design objects affected by
    # timing exceptions reused from myIP
    set ::acme::myIPStaParam(clk_name_mclk)     [get_clocks
                                                 cd1_clk]
    set ::acme::myIPStaParam(clk_name_extclk)   [get_clocks
                                                 SoC_extclk]
    set ::acme::myIPStaParam(virt_clk_name_int) [get_clocks
                                                 cd1_clk]
    # Selecting the corresponding instance
    current_instance chip_core/inst_hier1/inst_hier2/inst_hier3/
    inst_myIP
    # Setting the timing exceptions
    ::acme::myIPTimingExceptionsFunc
    current_instance > /dev/null
    return 1
}
```

What is claimed is:

1. A hardware-block timing-constraint specification method, for use at or below an RTL abstraction level, comprising:
defining a plurality of hardware-block timing-constraint categories according to at least one of:
type of timing constraint; and
timing-constraint operating mode;
defining a plurality of hardware-block timing-constraint commands;
wherein each of the plurality of hardware-block timing-constraint commands is categorized into one of the plurality of hardware-block timing-constraint categories; and
encapsulating the plurality of hardware-block timing-constraint commands within a plurality of modules usable, via an application programming interface, in a standalone mode or an integrated mode.

2. The method of claim 1, further comprising assembling the plurality of modules into at least one library.

3. The method of claim 1, wherein the type of timing constraint is selected from a group consisting of clock, input/output, timing exception, and environmental functions.

4. The method of claim 1, wherein the timing constraint operating mode is selected from a group consisting of test timing constraints and functional timing constraints.

5. The method of claim 1, wherein the step of defining a plurality of hardware-block timing-constraint commands comprises use of at least one of data abstraction, polymorphism, and parameterization.

6. The method of claim 1, wherein the step of encapsulating comprises creating a user application programming interface.

7. An integrated-circuit synthesis method for use at or below an RTL abstraction level, comprising:
integrating, via an application programming interface, a plurality of hardware-block timing-constraint modules into an electronic-design-automation environment;
wherein at least one of the plurality of hardware-block timing-constraint modules is usable in a stand-alone mode or an integrated mode; and
performing a timing analysis using the at least one of the plurality of hardware-block timing-constraint modules.

8. The method of claim 7, wherein the step of integrating comprises
integrating at least one hardware-block timing-constraint module from each of at least two providers.

9. The method of claim 7, wherein the step of integrating comprises:
performing a standalone static-timing-analysis check; and
checking the hardware-block timing-constraints in an integrated context.

10. An article of manufacture for hardware-block timing-constraint specification for use at or below an RTL abstraction level, the article of manufacture comprising:
at least one computer readable medium;
processor instructions contained on the at least one computer readable medium, the processor instructions configured to be readable from the at least one computer readable medium by at least one processor and cause the at least one processor to operate as to facilitate:
definition of a plurality of hardware-block timing-constraint categories according to at least one of:
type of timing constraint; and
timing-constraint operating mode;
definition of a plurality of hardware-block timing-constraint commands;
wherein each of the plurality of hardware-block timing-constraint commands is categorized into one of the plurality of hardware-block timing-constraint categories;
encapsulation of the plurality of hardware-block timing-constraint commands within a plurality of modules usable, via an application programming interface, in a stand-alone mode or an integrated mode.

11. The article of manufacture of claim 10, further comprising processor instructions configured to cause the at least one processor to operate as to facilitate assembling of the plurality of modules into at least one library.

12. The article of manufacture of claim 10, wherein the timing-constraint function is selected from the group consisting of clock, input/output, timing exception, and environmental functions.

13. The article of manufacture of claim 10, wherein the timing-constraint operating mode is selected from a group consisting of test timing constraints and functional timing constraints.

14. The article of manufacture of claim 10, wherein the definition of the plurality of hardware-block timing-constraint commands comprises use of at least one of data abstraction, polymorphism, and parameterization.

15. The article of manufacture of claim 10, wherein the encapsulation comprises creation of a user application programming interface.

16. A hardware-block synthesis-constraint specification method for use at or below an RTL abstraction level, comprising:
defining a plurality of hardware-block synthesis-constraint categories, the hardware-block synthesis-constraint categories being defined according to at least one of:
type of constraint; and
constraint operating mode;
defining a plurality of hardware-block synthesis-constraint commands;
wherein each of the plurality of hardware-block synthesis-constraint commands is categorized into one of the plurality of hardware-block synthesis-constraint categories;
encapsulating the plurality of hardware-block synthesis-constraint commands within a plurality of modules usable, via an application programming interface, in a stand-alone mode or an integrated mode.

17. The method of claim 16, wherein the type of constraint is selected from a group consisting of test, power, and physical constraint.

18. The method of claim 16, wherein the constraint operating mode is selected from a group consisting of a plurality of power modes comprising a standby mode.

19. The method of claim 18, wherein each of the plurality of power modes is dependent upon operating frequency and supply voltage.

20. An article of manufacture for integrated-circuit timing analysis for use at or below an RTL abstraction level, the article of manufacture comprising:
at least one computer readable medium;
processor instructions contained on the at least one computer readable medium, the processor instructions configured to be readable from the at least one computer readable medium by at least one processor and thereby cause the at least one processor to operate as to facilitate:
integration, via an application programming interface, of a plurality of hardware-block timing-constraint modules into an electronic-design-automation environment;
wherein at least one of the plurality of hardware-block timing constraint modules is usable in a stand-alone mode or an integrated mode; and
performance of a timing analysis using the at least one of the plurality of hardware-block timing-constraint modules.

21. The article of manufacture of claim 20, wherein the integration comprises integration of at least one hardware-block timing-constraint module from each of at least two providers.

22. The article of manufacture of claim 20, wherein the integration comprises:
performance of a standalone static-timing-analysis check; and
a check of the hardware-block timing-constraints in an integrated context.

23. An integrated-circuit synthesis method for use at or below an RTL abstraction level, comprising:
integrating, via an application programming interface, a plurality of hardware-block synthesis-constraint modules into an electronic-design-automation environment;
wherein at least one of the plurality of hardware-block synthesis-constraint modules is usable in a stand-alone mode or an integrated mode; and
performing a synthesis using the at least one of the plurality of hardware block synthesis-constraint modules.

24. The method of claim 23, wherein the step of integrating comprises integrating at least one hardware-block synthesis-constraint module from each of at least two providers.

25. The method of claim 23, wherein hardware-block synthesis constraints of the plurality of hardware-block synthesis-constraint modules comprise at least one of hardware-block timing constraints and hardware-block synthesis constraints.

26. An article of manufacture for integrated-circuit synthesis for use at or below an RTL abstraction level, the article of manufacture comprising:
   at least one computer readable medium;
   processor instructions contained on the at least one computer readable medium, the processor instructions configured to be readable from the at least one computer readable medium by at least one processor and thereby cause the at least one processor to operate as to facilitate:
   integration, via an application programming interface, of a plurality of hardware-block synthesis-constraint modules into an electronic-design-automation environment;
   wherein at least one of the plurality of hardware-block synthesis constraint modules is usable in a stand-alone mode or an integrated mode; and
   performance of a synthesis using the at least one of the plurality of hardware-block synthesis-constraint modules.

27. The article of manufacture of claim 26, wherein the integration comprises integration of at least one hardware-block synthesis-constraint module from each of at least two providers.

28. The article of manufacture of claim 26, wherein hardware-block synthesis constraints of the plurality of hardware-block synthesis-constraint modules comprise at least one of hardware-block timing constraints and hardware-block synthesis constraints.

29. An article of manufacture for hardware-block synthesis-constraint specification for use at or below an RTL abstraction level, the article of manufacture comprising:
   at least one computer readable medium;
   processor instructions contained on the at least one computer readable medium, the processor instructions configured to be readable from the at least one computer readable medium by at least one processor and cause the at least one processor to operate as to facilitate:
   definition of a plurality of hardware-block synthesis-constraint categories, the hardware-block synthesis-constraint categories being defined according to
   at least one of:
   type of constraint; and
   constraint operating mode;
   definition of a plurality of hardware-block synthesis-constraint commands;
   wherein each of the plurality of hardware-block synthesis-constraint commands is categorized into one of the plurality of hardware-block synthesis-constraint categories; and
   encapsulation of the plurality of hardware-block synthesis constraint commands within a plurality of modules usable, via an application programming interface, in a stand-alone mode or an integrated mode.

30. The article of manufacture of claim 29, wherein the type of constraint is selected from a group consisting of test, power, and physical constraint.

31. The article of manufacture of claim 29, wherein the constraint operating mode is selected from a group consisting of a plurality of power modes comprising a standby mode.

32. The article of manufacture of claim 31, wherein each of the plurality of power modes is dependent upon operating frequency and supply voltage.

33. A hardware-block constraint-specification method for use at or below an RTL abstraction level, comprising:
   defining a plurality of hardware-block constraint categories according to at least one of:
   type of constraint; and
   constraint operating mode;
   defining a plurality of hardware-block constraint commands;
   wherein each of the plurality of hardware-block constraint commands is categorized into one of the plurality of hardware-block constraint categories; and
   encapsulating the plurality of hardware-block constraint commands within a plurality of modules usable, via an application programming interface, in a stand-alone mode or an integrated mode.

34. An article of manufacture for hardware-block constraint specification for use at or below an RTL abstraction level, the article of manufacture comprising:
   at least one computer readable medium;
   processor instructions contained on the at least one computer readable medium, the processor instructions configured to be readable from the at least one computer readable medium by at least one processor and cause the at least one processor to operate as to facilitate: definition of a plurality of hardware-block constraint categories according to at least one of:
   type of constraint; and
   constraint operating mode;
   definition of a plurality of hardware-block constraint commands;
   wherein each of the plurality of hardware-block constraint commands is categorized into one of the plurality of hardware-block constraint categories;
   encapsulation of the plurality of hardware-block constraint commands within a plurality of modules usable, via an application programming interface, in a stand-alone mode or an integrated mode.

* * * * *

UNITED STATES PATENT AND TRADEMARK OFFICE
CERTIFICATE OF CORRECTION

PATENT NO. : 7,526,745 B2  Page 1 of 1
APPLICATION NO. : 11/294653
DATED : April 28, 2009
INVENTOR(S) : Vergara-Escobar It is certified that error appears in the above-identified patent and that said Letters Patent is hereby corrected as shown below:

In Column 3, Line 42, delete "the" and insert -- The --, therefor.

In Column 9, Line 19, delete ":myIPClocksPunc." and insert -- :myIPClocksFunc. --, therefor.

In Column 11, Line 18, delete "myIp" and insert -- myIP --, therefor.

In Column 12, Line 7, delete "myIPStaportGroups.tcl" and insert -- myIPStaPortGroups.tcl --, therefor.

Signed and Sealed this

Twentieth Day of October, 2009

David J. Kappos
*Director of the United States Patent and Trademark Office*